United States Patent
Kline et al.

(10) Patent No.: US 10,216,145 B2
(45) Date of Patent: Feb. 26, 2019

(54) INTERACTION BETWEEN MULTIPLE HOLOGRAMS

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 15/336,190

(22) Filed: Oct. 27, 2016

(65) Prior Publication Data

US 2018/0120766 A1     May 3, 2018

(51) Int. Cl.
H04N 13/00 (2018.01)
G03H 1/00 (2006.01)
G03H 1/22 (2006.01)
G03H 1/30 (2006.01)
(Continued)

(52) U.S. Cl.
CPC ............ *G03H 1/0005* (2013.01); *G03H 1/08* (2013.01); *G03H 1/2249* (2013.01); *G03H 1/30* (2013.01); *G06F 3/017* (2013.01); *G06F 3/0304* (2013.01); *G06F 3/04815* (2013.01); *G06F 9/453* (2018.02); *G03H 2001/0088* (2013.01);
(Continued)

(58) Field of Classification Search
CPC .......... G03H 1/0005; G03H 1/30; G03H 1/08; G03H 1/2249; G03H 2210/562; G03H 2210/62; G03H 2001/2284; G03H 2001/0088; G03H 2226/02;
(Continued)

(56) References Cited

U.S. PATENT DOCUMENTS

2009/0272805 A1    11/2009   Riddle et al.
2012/0194477 A1    8/2012    Krah
(Continued)

FOREIGN PATENT DOCUMENTS

WO     2010094948     8/2010
WO     2014189840     11/2014

OTHER PUBLICATIONS

24-7 Press Release, Launch of Responsive Hologram DID 'CUBICO', Nov. 25, 2015, http://www.24-7pressrelease.com/press-release/launch-of-responsive-hologram-did-cubico-415965.php, Last visited Sep. 22, 2016.
(Continued)

*Primary Examiner* — Allen C Wong
(74) *Attorney, Agent, or Firm* — Kunzler, PC (57) ABSTRACT

An apparatus for hologram interaction is disclosed. A method and system also perform the functions of the apparatus. The apparatus includes an identification module that identifies a first hologram being projected within a space. The first hologram is projected by a first system. The apparatus includes a projection module that projects a second hologram within the space. The second hologram projected by a second system. The apparatus includes a detection module that detects movement and position of the first hologram and an interaction module that controls position and movement of the second hologram to dynamically interact with the first hologram. The first hologram dynamically interacting with the second hologram includes reactions of the second hologram in response to the detected movement and the position of the first hologram.

20 Claims, 6 Drawing Sheets

(51) Int. Cl.
  G03H 1/08    (2006.01)
  G06F 3/01    (2006.01)
  G06F 3/03    (2006.01)
  G06F 3/0481  (2013.01)
  G06F 9/451   (2018.01)

(52) U.S. Cl.
  CPC ............... *G03H 2001/2284* (2013.01); *G03H 2210/562* (2013.01); *G03H 2210/62* (2013.01); *G03H 2226/02* (2013.01); *G03H 2226/04* (2013.01)

(58) Field of Classification Search
  CPC .............. G03H 2226/04; G06F 3/0304; G06F 3/04815; G06F 3/017; G06F 9/453
  USPC .......................................................... 348/40
  See application file for complete search history.

(56) References Cited

U.S. PATENT DOCUMENTS

2014/0267599 A1    9/2014  Drouin et al.
2015/0244747 A1    8/2015  Wickenkamp et al.
2017/0228839 A1*   8/2017  Motta ................... G06Q 50/16

OTHER PUBLICATIONS

NASDAQ, "Fairy Lights": Floating, Responsive 3D Holograms, David Floyd, Jul. 1, 2015, http://www.nasdaq.com/article/fairy-lights-floating-responsive-3d-holograms-cm492607, Last visited Sep. 22, 2016.

DIT, Security Holograms With Responsive Features, Suzanne Martin, https://www.dit.ie/media/ieo/pdf/activeholograms%20%282%29.pdf, Last visited Sep. 22, 2016.

OSA Publishing, Active holography in InGaAs/InP quantum-well microcavities, Hao Sun, David. D. Nolte, James Hyland, and Eric Harmon, vol. 38, 2013,https://www.osapublishing.org/ol/abstract.cfm?uri=ol-38-15-2792, Last visited Sep. 22, 2016.

SPIE, Hologram interaction based on brain wave measurement, Min-Chul Park, Thibault Leportier, Tien-Thong Nguyen Do and Sungchul Mun, Jan. 19, 2016, http://spie.org/newsroom/6282-hologram-interaction-based-on-brain-wave-measurement Last visited Sep. 22, 2016.

Bimber, Oliver, et al. "Interacting with augmented holograms." Integrated Optoelectronic Devices 2005. International Society for Optics and Photonics, 2005. http://www.jku.at/cg/content/e60566/e155460/e156613/AH_Interaction.pdf, Last visited Sep. 22, 2016.

* cited by examiner

INTERACTION BETWEEN MULTIPLE HOLOGRAMS

FIELD

The subject matter disclosed herein relates to holograms and more particularly relates to controlling a second hologram in response to actions of a first hologram.

BACKGROUND

Holograms are three-dimensional images formed with light. For example, a hologram may be formed by the interference of light beams from a laser or other coherent light source. Hologram technology, or holography, is advancing rapidly. Some holograms may be produced that move. For example, a hologram of a person may move in a similar way to how a person moves.

BRIEF SUMMARY

An apparatus for hologram interaction is disclosed. A method and system also perform the functions of the apparatus. The apparatus includes an identification module that identifies a first hologram being projected within a space. The first hologram is projected by a first system. The apparatus includes a projection module that projects a second hologram within the space. The second hologram projected by a second system. The apparatus includes a detection module that detects movement and position of the first hologram and an interaction module that controls position and movement of the second hologram to dynamically interact with the first hologram. The first hologram dynamically interacting with the second hologram includes reactions of the second hologram in response to the detected movement and the position of the first hologram.

The method for hologram interaction includes identifying a first hologram being projected within a space, where the first hologram is projected by a first system, and projecting a second hologram within the space, where the second hologram is projected by a second system. The method includes detecting movement and position of the first hologram, and controlling position and movement of the second hologram to dynamically interact with the first hologram. The first hologram dynamically interacting with the second hologram includes reactions of the second hologram in response to the detected movement and the position of the first hologram.

The system for hologram interaction includes a hologram projector, a processing unit, a memory in communication with the processing unit. The system includes an identification module that identifies a first hologram being projected within a space, where the first hologram is projected by a first system, and a projection module that projects a second hologram within the space, where the second hologram is projected by the hologram projector. The system includes a detection module that detects movement and position of the first hologram and an interaction module that controls position and movement of the second hologram to dynamically interact with the first hologram, where the first hologram dynamically interacting with the second hologram includes reactions of the second hologram in response to the detected movement and the position of the first hologram. The processing unit executes commands associated with said modules and the memory stores information associated with said modules.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processing unit to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processing unit of a general purpose computer, special purpose computer, or other programmable data processing apparatus to produce a machine, such that the instructions, which execute via the processing unit of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processing units. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

An apparatus for hologram interaction is disclosed. A method and system also perform the functions of the apparatus. The apparatus includes an identification module that identifies a first hologram being projected within a space. The first hologram is projected by a first system. The apparatus includes a projection module that projects a second hologram within the space. The second hologram projected by a second system. The apparatus includes a detection module that detects movement and position of the first hologram and an interaction module that controls position and movement of the second hologram to dynamically interact with the first hologram. The first hologram dynamically interacting with the second hologram includes reactions of the second hologram in response to the detected movement and the position of the first hologram.

In one embodiment, the identification module identifies the first hologram using a camera in communication with the second system and the detection module detects the movement and position of the first hologram using the camera. In another embodiment, the apparatus includes a communication module that interacts with the first system to establish a communication link between the first system and the second system, where the detection module detects movement and position of the first hologram by interacting with the first system over the communication link. In a further embodiment, the communication module also communicates position and movement of the second hologram to the first system over the communication link. In another embodiment, the detection module detects the movement and position of the first hologram using a camera and by interacting with the first system over the communication link. In another embodiment, the apparatus includes a security module that establishes a secure communication link between the first system and the second system. In another embodiment, the security module executes a secure login procedure where the second system logs into the first system and/or the first system logs into the second system.

In one embodiment, controlling position and movement of the second hologram to dynamically interact with the first hologram includes moving the second hologram in response to one or more of movement of the first hologram and a position of the first hologram, and/or positioning the second hologram with respect to the first hologram. In another embodiment, the apparatus includes a sound module that produces sound consistent with actions of the second hologram, where the sound module produces sounds consistent with position and movement of the second hologram in response to the detected movement and position of the first hologram. In another embodiment, the apparatus includes an action library, where the interaction module uses an action from the action library as a basis for movement and position of the second hologram, and where actions in the action library include predefined actions in response to movement and position of another hologram, and the actions of the action library are consistent with a form of the second hologram.

In another embodiment, the apparatus includes a rules module with rules and boundaries for the actions, movement and/or position of the second hologram, where the interaction module controls the actions, position and movement of the second hologram within the rules and boundaries prescribed by the rules module. In another embodiment, the rules and boundaries include allowable behaviors of the second hologram and/or disallowable behaviors of the second hologram. In another embodiment, the apparatus includes a physical object detection module that detects position and/or movement of a physical object in proximity to the first hologram and/or the second hologram, where the interaction module also controls position and movement of the second hologram in response to position and movement of the first hologram and in response to the detected position and movement of the physical object. In another embodiment, the interaction module also causes movement of the second hologram with respect to the first hologram, where the first hologram reacts to the movement of the second hologram.

The method for hologram interaction includes identifying a first hologram being projected within a space, where the first hologram is projected by a first system, and projecting a second hologram within the space, where the second hologram is projected by a second system. The method includes detecting movement and position of the first hologram, and controlling position and movement of the second hologram to dynamically interact with the first hologram. The first hologram dynamically interacting with the second hologram includes reactions of the second hologram in response to the detected movement and the position of the first hologram.

In one embodiment, identifying the first hologram comprises using a camera in communication with the second system and detecting the movement and position of the first hologram includes using the camera. In another embodiment, the method includes interacting with the first system to establish a communication link between the first system and the second system, where detecting movement and position of the first hologram includes interacting with the first system. In another embodiment, the method includes communicating position and movement of the second hologram to the first system over the communication link, detecting the movement and position of the first hologram using a camera and by interacting with the first system and using the camera, establishing a secure communication link between the first system and the second system, and executing a secure login procedure where the second system logs into the first system and/or the first system logs into the second system.

The system for hologram interaction includes a hologram projector, a processing unit, a memory in communication with the processing unit. The system includes an identification module that identifies a first hologram being projected within a space, where the first hologram is projected by a first system, and a projection module that projects a second hologram within the space, where the second hologram is projected by the hologram projector. The system includes a detection module that detects movement and position of the first hologram and an interaction module that controls position and movement of the second hologram to dynamically interact with the first hologram, where the first hologram dynamically interacting with the second hologram includes reactions of the second hologram in response to the detected movement and the position of the first hologram. The processing unit executes commands associated with said modules and the memory stores information associated with said modules.

In one embodiment, the system includes a camera, where the identification module identifies the first hologram using the camera and the detection module detects the movement and position of the first hologram using the camera.

Figure 1:
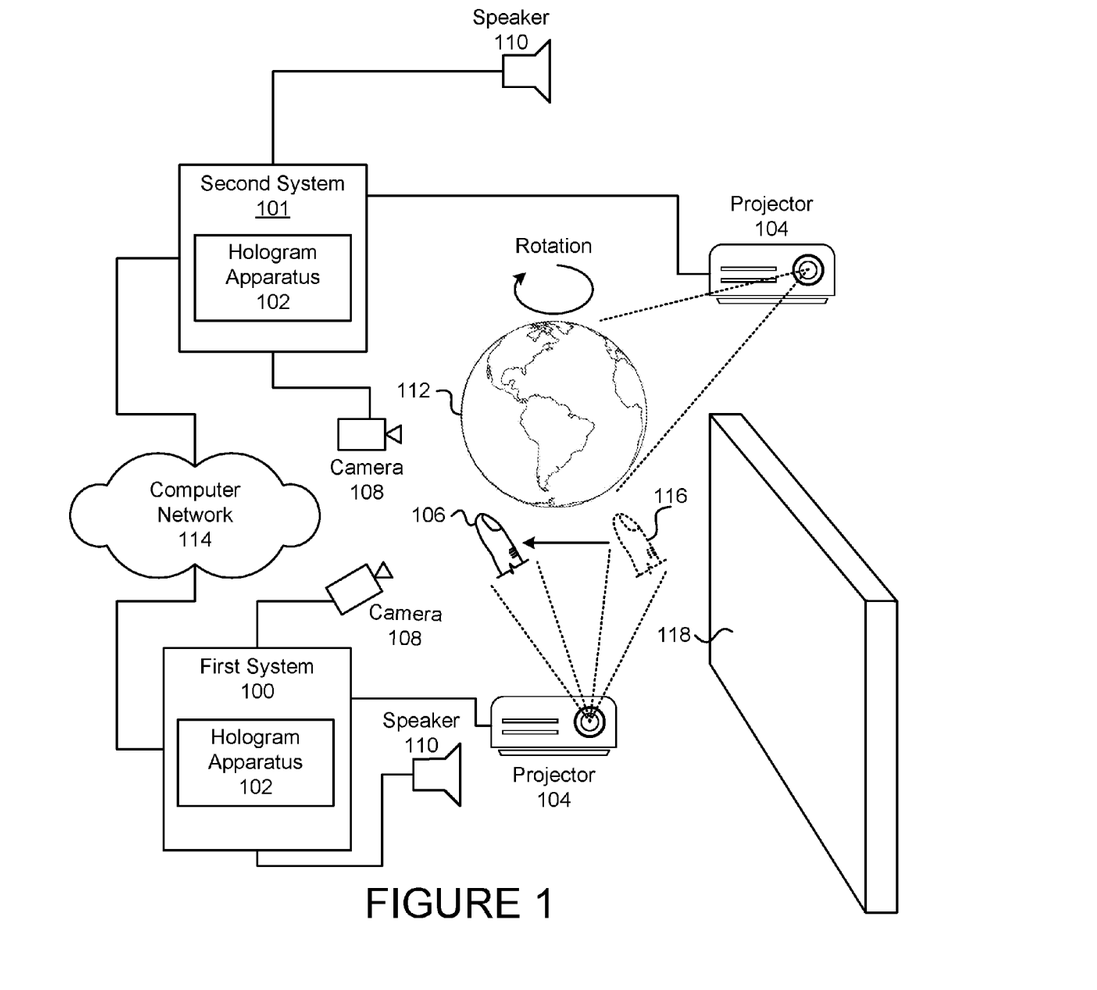
FIG. 1 is a schematic block diagram illustrating one embodiment of a first system and a second system for hologram interaction in accordance with one embodiment of the present invention.

FIG. 1 is a schematic block diagram illustrating one embodiment of a first system 100 and a second system 101 for hologram interaction in accordance with one embodiment of the present invention. The first system 100, in one embodiment, includes a hologram apparatus 102, a projector 104 generating a first hologram 106, a camera 108 and a speaker 110 and the second system 101 includes a hologram apparatus 102, a projector 104 generating a second hologram 112, a camera 108 and a speaker 110, where the first system 100 and the second system 101 may communicate over a computer network 114, which are described below.

The first system 100 and the second system 101 include one or more computing devices. A computing device may include a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, or another computing device comprising a processing unit (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium. A computing device, in a further embodiment, is configured to execute various programs, program code, applications, instructions, functions, and/or the like, which may access, store, download, upload, and/or the like data located on one or more servers. A computing device may be electrically coupled to a display (e.g., a touch-enabled display, an electronic display, etc.).

The first system 100 and the second system 101 each include a projector 104 capable of generating a hologram. The projector 104 may emit laser light or other coherent light suitable for generating a hologram. A hologram, as used herein, includes a holographic image, a volumetric display, a tomographic reconstruction or other technology that creates an image perceived to be three dimensional and may include images of the fauxlography category as well as true holographic images. The projector 104 may include equipment suitable for creating a hologram, such as beam splitters, transparent screens, mirrors and the like. For example, a screen may include a multi-sided screen, such as a cylindrical screen where a hologram is displayed within the cylinder, a spinning screen, etc. The screen may also be a multi-sided screen that may be viewed from multiple sides. The projector 104 may also make use of water vapor, water droplets, mist, fog, airborne particles or any other material that is within a space where the hologram is projected.

A hologram, as used herein, may include computer generated images, images created from physical objects, animals, people, etc., images created from photographs, videos, etc. For example, a hologram may be constructed computer-generated imagery created by an artist using a computer graphics application. A hologram may be any image that may be projected and viewed as a three-dimensional image from a particular perspective or from multiple perspectives. For example, a hologram may include an image that may be viewed from multiple angles that appears to be three-dimensional or may be viewed from a single perspective as a three-dimensional image. A hologram may be stationary, may move, or may be animated. For example, FIG. 1 displays a first hologram 106 in a final position that moved from an initial position 116. One of skill in the art will recognize other ways that a projector 104 and associated equipment may create a hologram that may interact with another hologram.

The space where the first hologram 106 and the second hologram 112 are projected, in one embodiment is a contiguous space where the first hologram 106 and the second hologram 112 may interact without barriers between the first hologram 106 and the second hologram 112. For example, space may be within a chamber, a cylindrical screen, etc. where the first hologram 106 and the second hologram 112 may interact. In another embodiment, the space may include a barrier, screen, etc. between the first hologram 106 and the second hologram 112, for example, where the interaction between the first hologram 106 and the second hologram 112 are intended to be separate, but still interact with each other. For example, the barrier may be in the form of bars to a cage where the first hologram 106 is a wild animal at a zoo and the second hologram 112 is a person visiting and interacting with the animal. One of skill in the art will recognize other spaces where the first hologram 106 and the second hologram 112 may interact.

Note that the first hologram 106 and second hologram 112 may be positioned with respect to one or more physical objects 118, such as a wall, a chair, a person, an animal, etc. For example, the first hologram 106 and second hologram 112 may be positioned to appear to be in front of a wall, sitting on a chair, interacting with a person or animal, etc.

The first system 100 and the second system 101 may each include a camera 108. The cameras 108, in one embodiment, are capable of viewing and detecting a hologram, including position and movement of the hologram. For instance, the cameras 108 may be typical cameras that are part of or used with the computing devices. The cameras 108, in another embodiment, may be devices separate from the computing devices, the first system 100, and/or the second system 101 that are in communication with the first system 100 and second system 101. In one embodiment, the cameras 108 are digital cameras capable of capturing images generating associated digital images, which may then be transmitted to the attached first or second systems 100, 101.

In some embodiments, the first system 100 and/or second system 101 each include one or more speakers 110. The speakers 110, in one embodiment, are connected to the computing devices and are capable of producing sound associated with the holograms. For example, the speakers 110 of the first system 100 may produce sound associated with the first hologram 106 and the speaker 110 of the second system 101 may produce sound associated with the second hologram 112.

A computer network 114, in one embodiment, connects the first system 100 to the second system 101 over a communication link. The computer network 114, in one embodiment, includes a digital communication network that transmits digital communications. The computer network 114 may include a wireless connection, such as a wireless cellular network, a local wireless network, such as a Wi-Fi network, a Bluetooth® network, a near-field communication ("NFC") network, an ad hoc network, and/or the like. The computer network 114 may include a wide area network ("WAN"), a storage area network ("SAN"), a local area network ("LAN"), an optical fiber network, the internet, or other digital communication network. The computer network 114 may include two or more networks. The computer network 114 may include one or more servers, routers, switches, and/or other networking equipment. The computer network 114 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

Figure 2:
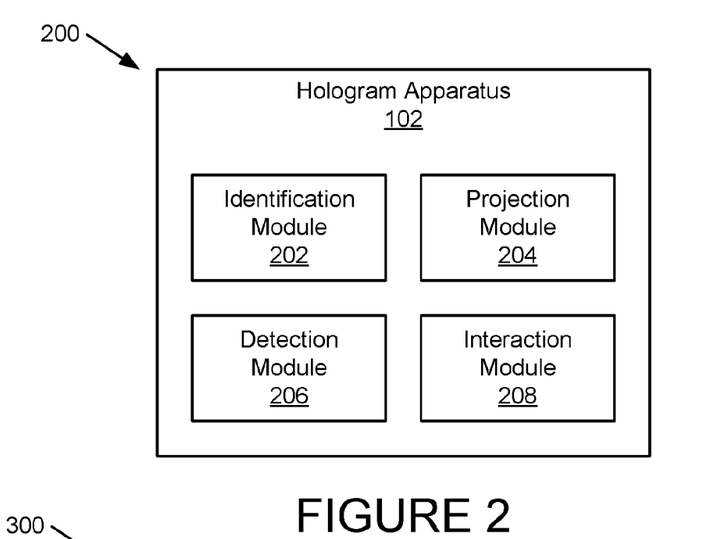
FIG. 2 is a schematic block diagram illustrating one embodiment of an apparatus for hologram interaction in accordance with one embodiment of the present invention.

FIG. 2 is a schematic block diagram illustrating one embodiment of an apparatus 200 for hologram interaction in accordance with one embodiment of the present invention. The apparatus 200 includes one embodiment of a hologram apparatus 102 with an identification module 202, a projection module 204, a detection module 206, and an interaction module 208, which are described below.

The apparatus 200 includes an identification module 202 that identifies a first hologram 106 being projected within a space, where the first hologram 106 is projected by the first system 100. In one embodiment, the identification module 202 identifies the first hologram 106 using a camera 108 in communication with the second system 101. In another embodiment, the identification module identifies the first hologram 106 over a communication link between the first system 100 and the second system 101. For example, the identification module 202 may communicate with the first system 100 that may inform the identification module 202 that the first system 100 is projecting the first hologram 106. In another embodiment, the identification module 202 uses information from the camera 108 of the second system along with information from the first system 100 to identify the first hologram 106.

In one embodiment, the identification module 202 identifies a shape of the first hologram 106. The identification module 202 may then associate the determined shape with a physical object specifically or generally. For example, the identification module 202 may identify the first hologram 106 as a person, or a particular type of animal, such as a cat based on the shape of the object. The identification module 202 may identify the first hologram 106 as a shape, such as a sphere, a cube, a cylinder, etc. In another embodiment, the identification module 202 may use information from the first system 100 to identify the object. For example, the first system 100 may transmit data to the second system 101 that indicates that the first hologram 106 is a cat, a person, a particular person, a chair, etc.

In one embodiment, the identification module 202 identifies an initial position of the first hologram 106. For example, the identification module 202 may identify a particular direction, height, coordinate, position relative to an object, and the like of the first hologram 106. The identification module 202, may also identify an initial orientation of the first hologram 106. One of skill in the art will recognize other information that the identification module 202 may collect to identify the first hologram 106.

The apparatus 200 includes a projection module 204 that projects the second hologram 112 within the space. The second hologram 112 is projected by the second system 101. The projection module 204 may project the second hologram 112 using the projector 104 connected to the second system 101. In another embodiment, the projection module 204 projects the second hologram 112 using a projector 104 connected to the first system 100 based on control signals sent from the second system 101. The projection module 204 may use equipment suitable for generating the second hologram 112, such as a screen, a beam splitter, lenses, mirrors, and the like. In one embodiment, the projection module 204 uses equipment that is used by the first system 100 to generate the second hologram 112, such as the same screen. In another embodiment, the projection module 204 projects the second hologram 112 in the space in a position in relation to the first hologram 106 so that the second hologram 112 may interact with the first hologram 106.

The apparatus 200 includes a detection module 206 that detects movement and position of the first hologram 106. For example, the detection module 206 detects the movement and position of the first hologram 106 using the camera 108 connected to the second system 101. In another embodiment, the detection module 206 detects the movement and position of the first hologram 106 using the camera 108 connected to the first system 100 by way of a communication link between the first system 100 and the second system 101.

For example, the first system 100 may transmit data indicative of position, movement, size, type, etc. of the first hologram 106. In one embodiment, the identification module 202, the projection module 204 and the detection module 206 coordinate to use a same coordinate system, a same point of reference, etc. so that the projection module 204 projects the second hologram 112 in a position relative to the first hologram 106.

In one embodiment, the detection module 206 detects position of the first hologram 106 at various time intervals and with regard to a particular coordinate system, reference point, etc. In addition, the detection module 206 detects movement of the first hologram 106 in terms of movement from one point to another. The detection module 206 may also detect movement of the first hologram 106 such as spinning, one part of the first hologram 106 moving with respect to the first hologram 106 as a whole, etc. The detection module 206 may detect a shape of the first hologram 106.

For example, the detection module 206 may detect a location of some or all of the exterior surfaces of the first hologram 106, which may include determining a type of the first hologram 106. In one embodiment, where the first hologram is a person, the detection module 206 may detect movement of a hand, arm, leg, etc. in situations where the first hologram 106 is stationary or moving. The person may be standing and moving a finger, as partially depicted in FIG. 1 as the first hologram 106 moves from an initial position 116 to a final position (i.e. 106) as indicated.

In one embodiment, the detection module 206 detects a type of first hologram 106, such as determining if the first hologram 106 is a person, identity of a person, characteristics of the person, such as gender, age, etc., an object and the type of the object, an animal and the type of animal, and the like. In one example, the detection module 206 may match the first hologram 106 with an image in a library of images. In another example, the detection module 206 detects general characteristics of the first hologram 106, such as a general shape, number of legs, size, etc. and matches the characteristics with known characteristics of various animals, people, objects, etc. to determine at least a general type of the first hologram 106, such as "human," and may also match fine details of the first hologram 106 to further classify the first hologram 106. The detection module 206 may use characteristics, images, descriptions, etc. in various combinations to detect a type of the first hologram 106.

In one embodiment, the detection module 206 detects movement and position of the first hologram 106 from input received from the camera 108 of the second system 101 or from the camera 108 of the first system 100. In another embodiment, the detection module 206 detects movement and position of the first hologram 106 from data transmitted from the first system 100 over a communication link. In another embodiment, the detection module 206 detects movement and position of the first hologram 106 using input from the camera 108 and from data from the first system 100.

The apparatus 200 includes an interaction module 208 that controls position and movement of the second hologram 112 to dynamically interact with the first hologram 106. The first hologram 106 dynamically interacting with the second hologram 112 includes reactions of the second hologram 112 in response to the detected movement and the position of the first hologram 106, as detected by the detection module 206.

In one embodiment, controlling position and movement of the second hologram 112 to dynamically interact with the first hologram 106 includes moving the second hologram 112 in response to movement of the first hologram 106 and/or a position of the first hologram 106. In another embodiment, controlling position and movement of the second hologram 112 to dynamically interact with the first hologram 106 includes positioning the second hologram 112 with respect to the first hologram 106.

For example, where the first hologram 106 is a finger, a hand with a finger, a person moving a finger, etc., as depicted in FIG. 1, and the second hologram 112 is a globe, as depicted in FIG. 1, the interaction module 208 may cause the globe to spin in response to the finger of the first hologram 106 moving next to the second hologram 112 as depicted. In another example, where the first hologram 106 is a person and the second hologram 112 is a cat, the interaction module 208 may cause the second hologram 112 of the cat to move upward, the cat to arch its back, etc. when the first hologram 106 of the person makes a motion similar to a person picking up a cat. The position of the second hologram 112 of the cat with respect to the first hologram 106 may be such that the person appears to be picking up the cat.

In another embodiment, the interaction module 208 causes movement of the second hologram 112 with respect to the first hologram 106, where the first hologram 106 then reacts to the movement of the second hologram 112. For example, the first system 100 may also include a hologram apparatus 102 as depicted in FIG. 1 so that both the first hologram 106 and the second hologram 112 react to each other. Note that the movements of the second hologram 112 in response to the first hologram 106 and the first hologram 106 in response to the second hologram 112 may occur simultaneously in an ongoing process so that the movements are fluid and natural. In one embodiment, the first system 100 and the second system 101 are subsystems that are part of a larger system. In this larger system, each subsystem may operate to communicate as described above.

Figure 3:
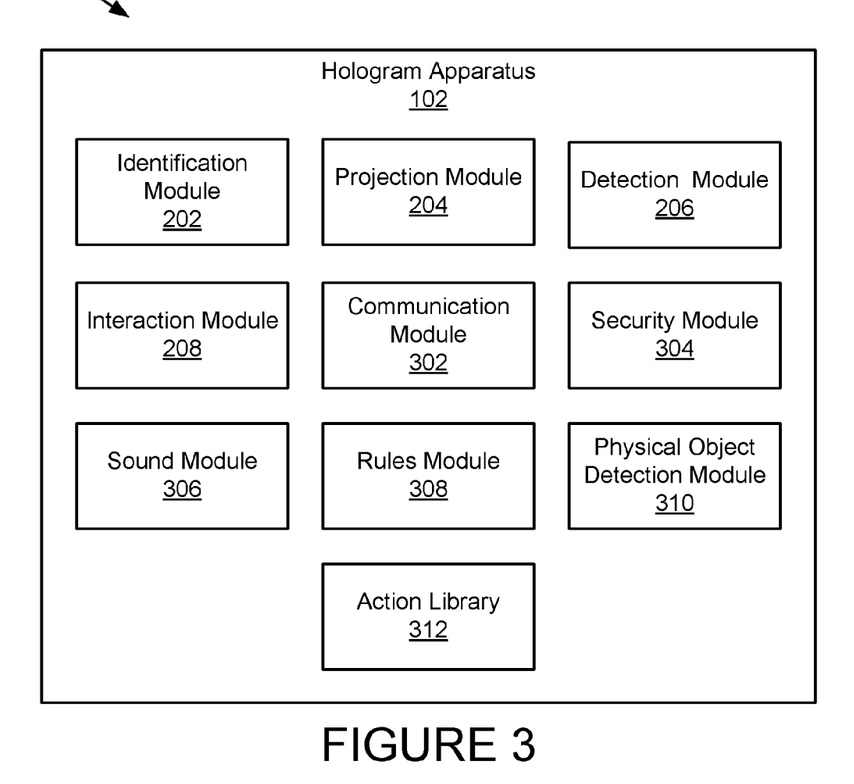
FIG. 3 is a schematic block diagram illustrating another embodiment of an apparatus for hologram interaction in accordance with one embodiment of the present invention.

FIG. 3 is a schematic block diagram illustrating another embodiment of an apparatus 300 for hologram interaction in accordance with one embodiment of the present invention. The apparatus 300 includes another embodiment of the hologram apparatus 102 with an identification module 202, a projection module 204, a detection module 206, and an interaction module 208, which are substantially similar to those described above in relation to the apparatus 200 of FIG. 2. In various embodiments, the apparatus 300 may also include a communication module 302, a security module 304, a sound module 306, a rules module 308, a physical object detection module 310 and/or an action library 312, which are described below.

The apparatus 300, in one embodiment, includes a communication module 302 that interacts with the first system 100 to establish a communication link between the first system 100 and the second system 101. The communication link established by the communication module 302, in one embodiment, is the same communication link described above in relation to the apparatus 200 of FIG. 2. Establishing a communication link may include a handshaking process between the first system 100 and the second system 101 that may include exchange of initial data, such as communication parameters, system information, etc. In one embodiment, the detection module 206 detects movement and position of the first hologram 106 by interacting with the first system 100 over the communication link. In another embodiment, the communication module 302 communicates movement and position information of the second hologram 112 to the first system 100 over the communication link and may receive input from the projection module 204 and/or interaction module 208.

In one embodiment, the detection module 206 detects the movement and position of the first hologram 106 using a camera 108 and by interacting with the first system 100 over the communication link. For example, the first system 100 may report basic movement and position information about the first hologram 106 and the detection module 206 may also receive information from the camera 108 (either connected to the first system 100 or second system 101) that provides additional information, such as fine details about movement and position of the first hologram 106.

In one embodiment, the apparatus 300 includes a security module 304 that establishes a secure communication link between the first system 100 and the second system 101. For example, the secure communication link may be encrypted or otherwise protected to prevent access by other systems. In another embodiment, the security module 304 executes a secure login procedure where the second system 101 logs into the first system 100 and/or the first system 100 logs into the second system 101. For example, where the first system 100 is a stationary system that produces holograms in a specific space, the second system 101 may be part of a portable electronic device and may log into the first system 100 for access to the first hologram 106 for access and interaction between the second hologram 112 and the first hologram 106.

The apparatus 300, in some embodiments, includes a sound module 306 that produces sound consistent with actions of the second hologram 112, for example using the speaker 110 connected to the second system 101. In one embodiment, the sound module 306 produces sounds consistent with position and movement of the second hologram 112 in response to the detected movement and position of the first hologram 106. For example, if the first hologram 106 is a person and the second hologram 112 is a cat, the sound module 306 may produce purring sounds when the first hologram 106 of the person makes a motion representing petting the cat of the second hologram 112. Likewise, the first system 100 may include a sound module 306 and speaker 110 connected to the first system 100 that makes sounds associated with the first hologram 106.

The apparatus 300, in embodiment, includes a rules module 308 that includes rules and/or boundaries for the actions, movement and position of the second hologram 112 where the interaction module 208 controls the actions, position and movement of the second hologram 112 within the rules and boundaries prescribed by the rules module 308. For example, the rules module 308 may be aware of space limitations where the first hologram 106 and second hologram 112 are being projected and may communicate the space limitations to the interaction module 208.

In another example, the rules module 308 may include rules dictating behavior of the second hologram 112 where the rules comply with social norms. For instance, the rules may dictate that the second hologram 112 is banned from making obscene gestures. The rules of the rules module 308 may also limit sounds by the sound module 306, which may prohibit certain words and phrases. The rules and boundaries may include allowable behaviors of the second hologram 112 and/or disallowable behaviors of the second hologram 112. One of skill in the art will recognize other rules and boundaries that govern the actions, movement and position of the second hologram 112.

The apparatus 300 includes, in one embodiment, a physical object detection module 310 that detects position and/or movement of a physical object 118 in proximity to the first hologram 106 and/or the second hologram 112, where the interaction module 208 also controls position and movement of the second hologram 112 in response to position and movement of the first hologram 106 and in response to the detected position and movement of the physical object 118. For example, if the physical object 118 is a chair, the first hologram 106 is a person and the second hologram 112 is a cat, the physical object detection module 310 may detect the chair and the detection module 206 may detect the first hologram 106 of the person sitting in the chair so that the interaction module 208 may cause the second hologram 112 of the cat to jump up the chair and onto the lap of the first hologram 106.

The physical object detection module 310 may use the camera 108 of the first system 100 or second system 101 to detect the position or movement of one or more physical objects 118, such as furniture, a person, an animal, etc. In other embodiments, the physical object detection module 310 may use other sensors that may detect physical objects 118 and movement of the physical objects 118.

The apparatus 300, in some embodiments, includes an action library 312 where the interaction module 208 uses an action from the action library 312 as a basis for movement and position of the second hologram 112. Actions in the action library 312, in some embodiments, include predefined actions. For example, if the second hologram 112 is a cat, the actions in the action library 312 may include typical actions of cats. In some embodiments, actions in the action library 312 are designed to be taken in response to movement and position of another hologram. For example, the interaction module 208 may use an action from the action library 312 to control movement and position of the second hologram 112 in response to movement and position of the first hologram 106 where the actions of the action library 312 are consistent with the form of the second hologram 112.

For example, where the second hologram 112 is a cat and the first hologram 106 is a person, the detection module 206 may detect movement of the first hologram 106 consistent with a person picking up a cat. The interaction module 208 may use the action of picking up a cat to retrieve an action in the action library 312 that mimics a cat arching its back, moving upward while being picked up, etc. and may then play the action. The actions in the action library 312 may be independent of an action of another hologram or may be intended to correspond to actions of another hologram.

In another embodiment, the action library 312 may also include data useful to by the projection module 204 to create the second hologram 112 along with associated actions. For example, the action library 312 may be specific to a cat and may include instructions of how to project a cat hologram and actions in the form of computer instructions where the actions are consistent with actions of a cat. In another embodiment, the actions in the action library 312 may include other holograms, such as other animals, famous people, objects, etc. One of skill in the art will recognize other actions in an action library 312 and associated triggers.

Figure 4:
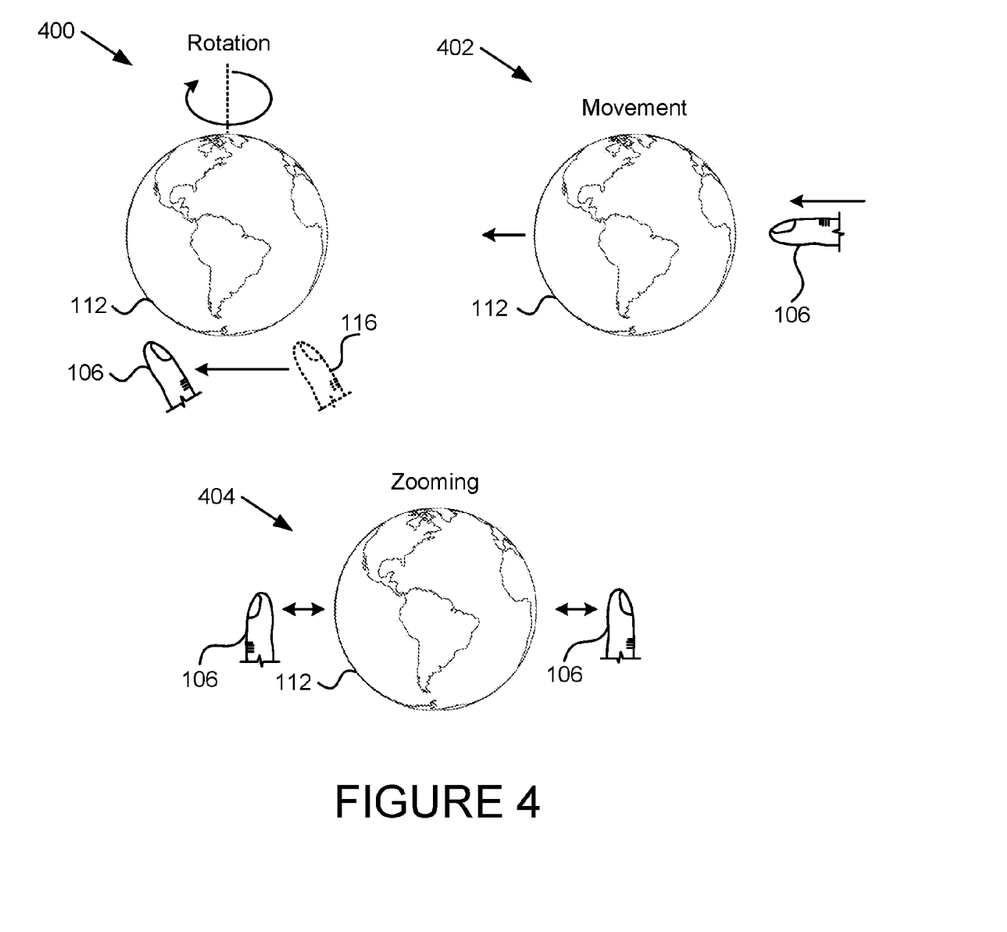
FIG. 4 is a schematic block diagram depicting various interactions between a first hologram and a second hologram.

FIG. 4 is a schematic block diagram depicting various interactions between a first hologram 106 and a second hologram 112. The top left diagram 400 is similar to the diagram in FIG. 1. In FIG. 4, the first hologram 106 is a finger. In other embodiments, the first hologram 106 may include more than a finger, such as a hand, an arm, an upper torso and appendages of a person, a whole person, etc. The second hologram 112 is a hologram of a globe depicting the earth. As depicted in FIG. 1 and described in FIG. 2, the top left diagram 400 depicts the first hologram 106 of a finger moving from an initial position 116 to the position of the first hologram 106, which is intended to depict the first hologram 106 making a motion consistent with a finger touching a globe and spinning the globe on an axis. In response, the interaction module 208 may cause the second hologram 112 of the globe to spin.

Spinning of the second hologram 112 of the globe is one possible action that may occur as a result of the first hologram 112 of the finger moving from the initial position 116 to the position of the first hologram 106. In one embodiment, movements of the second hologram 112 in response to some action of the first hologram 106 occur based on a set of reactions that occur in response to particular actions of any hologram where the reactions are independent of the first hologram 106 or first system 100. In another embodiment, the reactions of the second hologram 112 are typical of the particular form of the second hologram 112, such as typical movements of a cat where the second hologram 112 is a cat. In the depicted embodiment where the second hologram 112 is a globe, actions of the globe may be typical of a physical model of a globe that spins on an axis.

In another embodiment, interaction between the first system 100 and second system 101 includes an exchange of rules, guidelines, an action library 312, etc. so that movement of the second hologram 112 is coordinated with movement of the first hologram 106. For example, the second system 101 may communicate a set of actions to the first system 100 so that if the first system 100 directs the first hologram 106 to implement an action from the set of actions, the second system 101 then causes the second hologram 112 to react to the particular action of the first hologram 106. One of skill in the art will recognize other ways that the second hologram 112 reacts with respect to actions of the first hologram 106.

The top right diagram 402 is intended to depict the first hologram 106 of the finger moving toward the second hologram 112 of the globe and the interaction module 208 then causes the second hologram 112 of the globe to move horizontally in a same direction as the first hologram 106 moves. In the bottom diagram 404, the first hologram 106 is two fingers moving in and out in a direction toward and away from the second hologram 112 of the globe. In response, the interaction module 208 may cause the second hologram 112 of the globe to shrink in size as the first hologram 106 of the fingers come closer together or to increase in size as the first hologram 106 of the fingers move away from each other. The diagrams 400, 402, 404 of FIG. 4 are possible interactions between a first hologram 106 and a second hologram 112 and one of skill in the art will recognize other interactions and other holograms that may interact.

Figure 5:
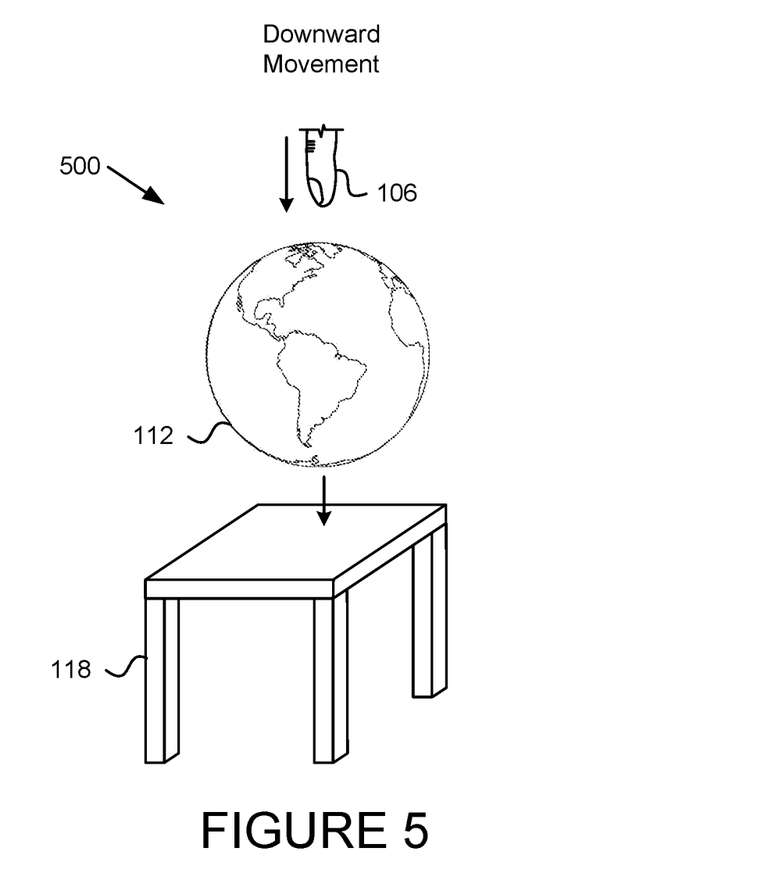
FIG. 5 is a schematic block diagram depicting an interaction between a first hologram and a second hologram and a physical object.

FIG. 5 is a schematic block diagram 500 depicting an interaction between a first hologram 106 and a second hologram 112 and a physical object 118. The diagram 500 depicts a first hologram 106 as a finger, a second hologram 112 as a globe, and a physical object 118 as a table. In the diagram 500, the first hologram 106 of the finger moves downward toward the second hologram 112 of the globe. In response, the interaction module 208 may move the globe downward, but due to the presence of the physical object 118 in the form of a table, the interaction module 208 in conjunction with the rules module 308 may limit movement of the second hologram 112 to stop at the table top. The diagram 500 is intended to demonstrate one interaction between a first hologram 106, a second hologram 112 and a physical object 118, but one of skill in the art will recognize other interactions and other holograms that may interact with each other and with a physical object 118.

Figure 6:
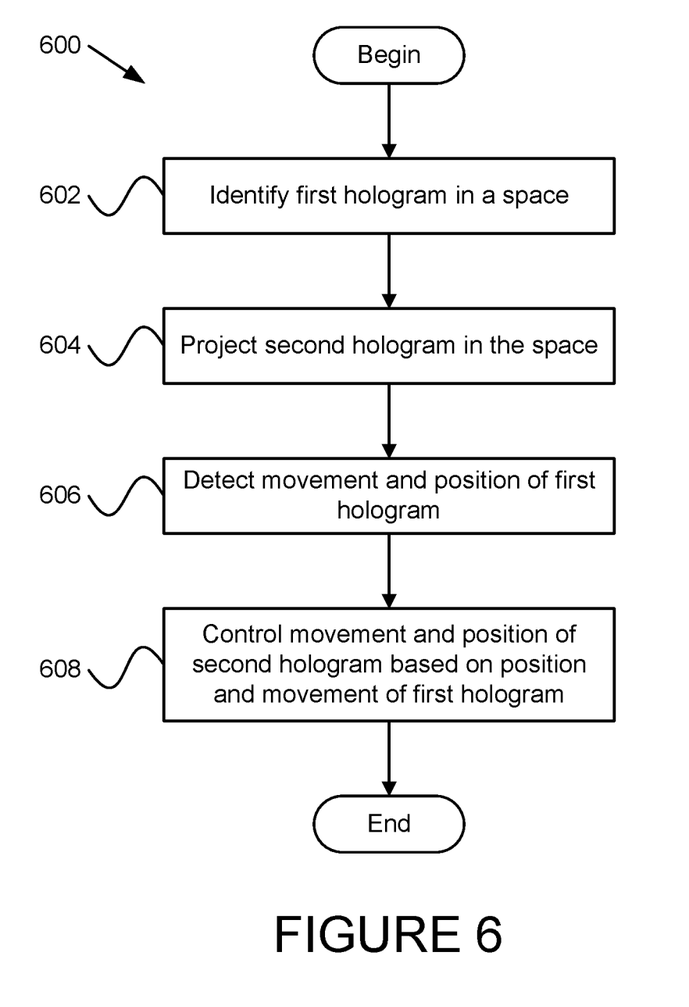
FIG. 6 is a schematic flow chart diagram illustrating one embodiment of a method for hologram interaction in accordance with one embodiment of the present invention.

FIG. 6 is a schematic flow chart diagram illustrating one embodiment of a method 600 for hologram interaction in accordance with one embodiment of the present invention. The method 600 begins and identifies 602 a first hologram 106 being projected within a space, where the first hologram 106 is projected by a first system 100. The method 600 projects 604 a second hologram 112 within the space, where the second hologram 112 is projected by a second system 101. The method 600 detects 606 movement and position of the first hologram 106 and controls 608 position and movement of the second hologram 112 to dynamically interact with the first hologram 106. The first hologram 106 dynamically interacting with the second hologram 112 includes reactions of the second hologram 112 in response to the detected movement and the position of the first hologram 106, and the method 600 ends. In various embodiments, the identification module 202, the projection module 204, the detection module 206 and the interaction module 208 perform the actions of the method 600.

Figure 7:
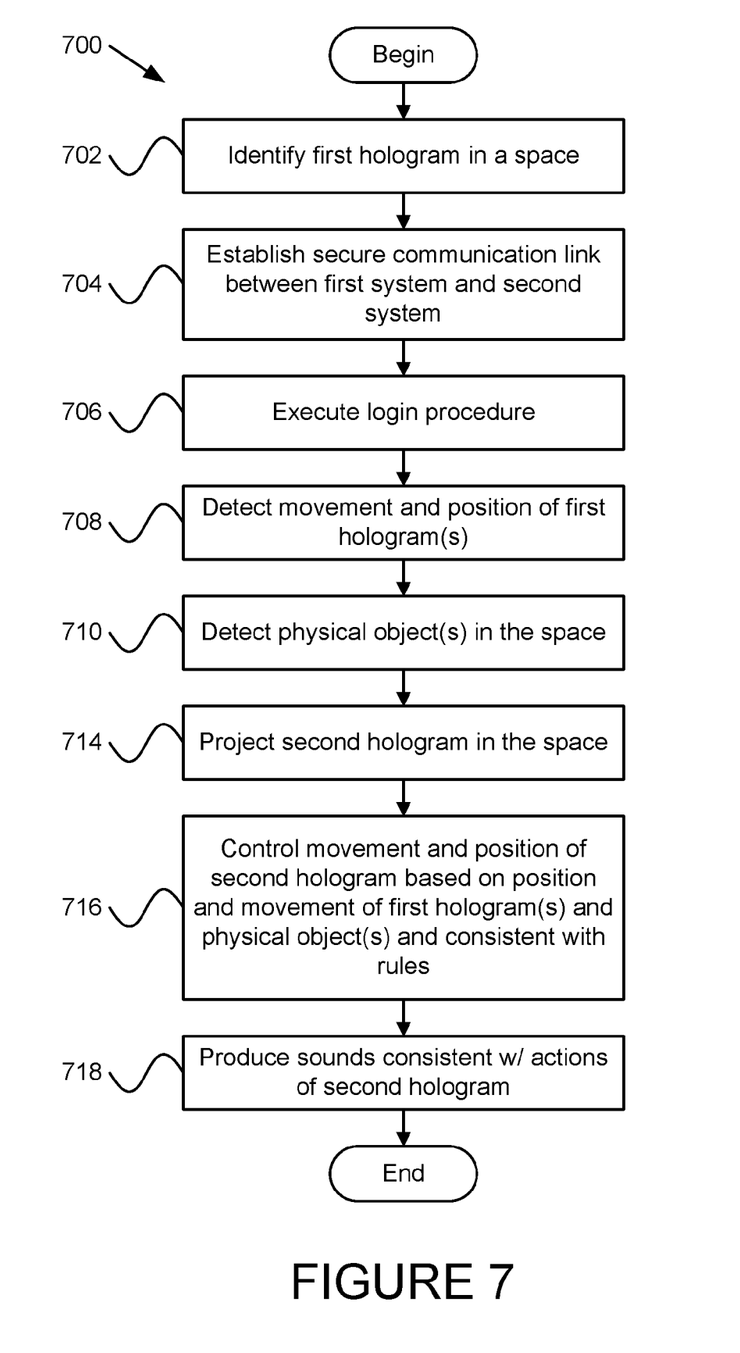
FIG. 7 is a schematic flow chart diagram illustrating another embodiment of a method for hologram interaction in accordance with one embodiment of the present invention.

FIG. 7 is a schematic flow chart diagram illustrating another embodiment of a method 700 for hologram interaction in accordance with one embodiment of the present invention. The method 700 begins and identifies 702 a first hologram 106 being projected within a space, where the first hologram 106 is projected by a first system 100. The identification module 202 may identify 702 the first hologram 106. In one embodiment, the method 700 establishes 704 a secure communication link between the first system 100 and a second system 101 and may execute 706 a login procedure. For example, the security module 304 may establish 704 the secure communication link and execute 706 the login procedure as describe above in relation to the apparatus 300 of FIG. 3.

The method 700 detects 708 movement and position of the first hologram 106 and detects 710 position and movement of one or more physical objects 118 in the space. For example, the detection module 206 may detect position and movement of the first hologram 106 and the physical object detection module 310 may detect position and movement of physical objects 118 within the space. The method 700 projects 714 a second hologram 112 within the space where the second hologram 112 is projected by the second system 101. The projection module 204 may project 714 the second hologram 112.

The method 700 controls 716 position and movement of the second hologram 112 to dynamically interact with the first hologram 106, where the first hologram 106 dynamically interacting with the second hologram 112 includes reactions of the second hologram 112 in response to the detected movement and the position of the first hologram 106 and of the one or more physical objects 118. The interaction module 208 may control 716 movement and position of the second hologram 112. The method 700 optionally produces 718 sounds consistent with actions of the second hologram 112 that are consistent with position and movement of the second hologram 112 in response to the detected movement and position of the first hologram 106. For example, the sound module 306 may produce 318 the sounds.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an identification module that identifies a first hologram being projected within a space, the first hologram projected by a first system;
   a projection module that projects a second hologram within the space, the second hologram projected by a second system;
   a detection module that detects movement and position of the first hologram; and
   an interaction module that controls position and movement of the second hologram to dynamically interact with the first hologram, wherein the first hologram dynamically interacting with the second hologram comprises reactions of the second hologram in response to the detected movement and the position of the first hologram, wherein said modules comprise one or more of hardware circuits, a programmable hardware device and executable code, the executable code stored on one or more computer readable storage media.

2. The apparatus of claim 1, wherein the identification module identifies the first hologram using a camera in communication with the second system and the detection module detects the movement and position of the first hologram using the camera.

3. The apparatus of claim 1, further comprising a communication module that interacts with the first system to establish a communication link between the first system and the second system, wherein the detection module detects movement and position of the first hologram by interacting with the first system over the communication link.

4. The apparatus of claim 3, wherein the communication module further communicates position and movement of the second hologram to the first system over the communication link.

5. The apparatus of claim 3, wherein the detection module detects the movement and position of the first hologram using a camera and by interacting with the first system over the communication link.

6. The apparatus of claim 3, further comprising a security module that one or more of:
establishes a secure communication link between the first system and the second system; and
executes a secure login procedure wherein one or more of the second system logs into the first system and the first system logs into the second system.

7. The apparatus of claim 1, wherein controlling position and movement of the second hologram to dynamically interact with the first hologram comprises one or more of:
moving the second hologram in response to one or more of movement of the first hologram and a position of the first hologram; and
positioning the second hologram with respect to the first hologram.

8. The apparatus of claim 1, further comprising a sound module that produces sound consistent with actions of the second hologram, wherein the sound module produces sounds consistent with position and movement of the second hologram in response to the detected movement and position of the first hologram.

9. The apparatus of claim 1, further comprising an action library, wherein the interaction module uses an action from the action library as a basis for movement and position of the second hologram, wherein actions in the action library comprise predefined actions in response to movement and position of another hologram, and wherein the actions of the action library are consistent with a form of the second hologram.

10. The apparatus of claim 1, further comprising a rules module comprising one or more of rules and boundaries for the actions, movement and position of the second hologram, wherein the interaction module controls the actions, position and movement of the second hologram within the rules and boundaries prescribed by the rules module.

11. The apparatus of claim 10, wherein the rules and boundaries comprise one or more of allowable behaviors of the second hologram and disallowable behaviors of the second hologram.

12. The apparatus of claim 1, further comprising a physical object detection module that detects one or more of position and movement of a physical object in proximity to one or more of the first hologram and the second hologram, wherein the interaction module further controls position and movement of the second hologram in response to position and movement of the first hologram and in response to the detected position and movement of the physical object.

13. The apparatus of claim 1, wherein the interaction module further causes movement of the second hologram with respect to the first hologram, wherein the first hologram reacts to the movement of the second hologram.

14. A method comprising:
identifying a first hologram being projected within a space, the first hologram projected by a first system;
projecting a second hologram within the space, the second hologram projected by a second system;
detecting movement and position of the first hologram; and
controlling position and movement of the second hologram to dynamically interact with the first hologram, wherein the first hologram dynamically interacting with the second hologram comprises reactions of the second hologram in response to the detected movement and the position of the first hologram.

15. The method of claim 14, wherein identifying the first hologram comprises using a camera in communication with the second system and detecting the movement and position of the first hologram comprises using the camera.

16. The method of claim 14, further comprising interacting with the first system to establish a communication link between the first system and the second system, wherein detecting movement and position of the first hologram comprises interacting with the first system.

17. The method of claim 16, further comprising one or more of:
communicating position and movement of the second hologram to the first system over the communication link;
detecting the movement and position of the first hologram using a camera and by interacting with the first system and using the camera;
establishing a secure communication link between the first system and the second system; and
executing a secure login procedure wherein one or more of the second system logs into the first system and the first system logs into the second system.

18. The method of claim 16, further comprising detecting one or more of position and movement of a physical object in proximity to one or more of the first hologram and the second hologram, further comprising controlling position and movement of the second hologram in response to position and movement of the second hologram in response to the detected position and movement of the physical object.

19. A second system comprising:
a hologram projector;
a processing unit;
a memory in communication with the processing unit;
an identification module that identifies a first hologram being projected within a space, the first hologram projected by a first system;
a projection module that projects a second hologram within the space, the second hologram projected by the hologram projector;
a detection module that detects movement and position of the first hologram; and
an interaction module that controls position and movement of the second hologram to dynamically interact with the first hologram, wherein the first hologram dynamically interacting with the second hologram comprises reactions of the second hologram in response to the detected movement and the position of the first hologram, wherein the processing unit executes commands associated with said modules and the memory stores information associated with said modules.

20. The second system of claim 19, further comprising a camera, wherein the identification module identifies the first hologram using the camera and the detection module detects the movement and position of the first hologram using the camera.

* * * * *